Sept. 17, 1968    S. A. FRANCIS    3,401,560
OCEANOGRAPHIC MEASURING AND RECORDING DEVICE
Filed April 7, 1965    3 Sheets-Sheet 1
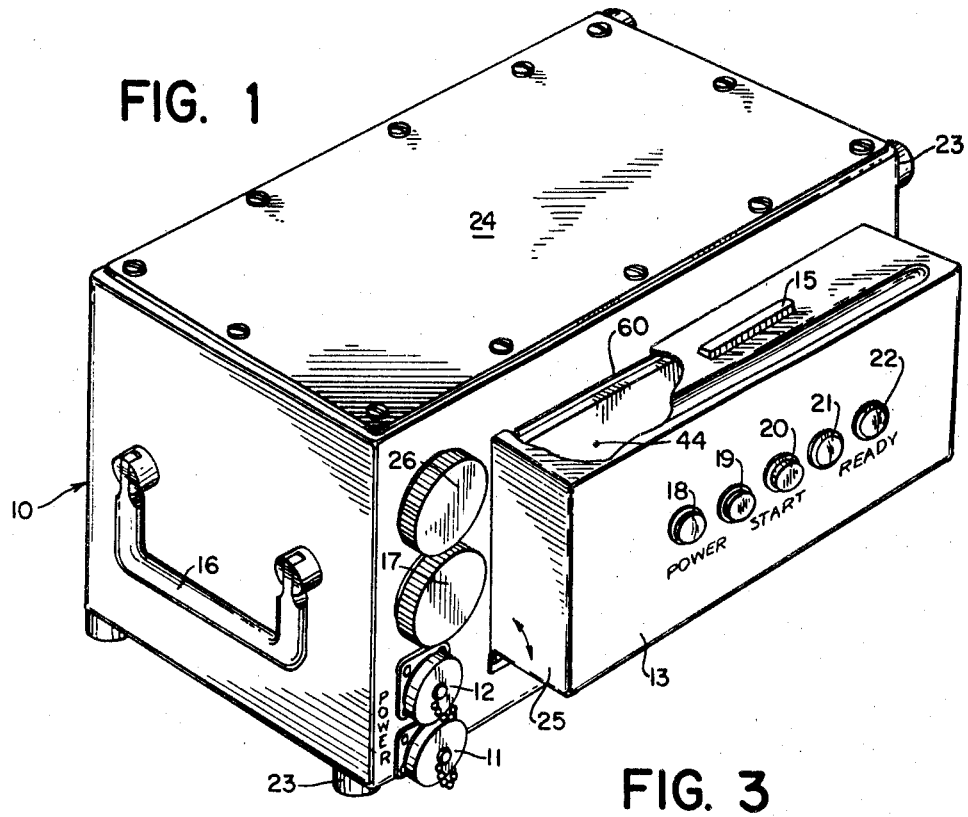
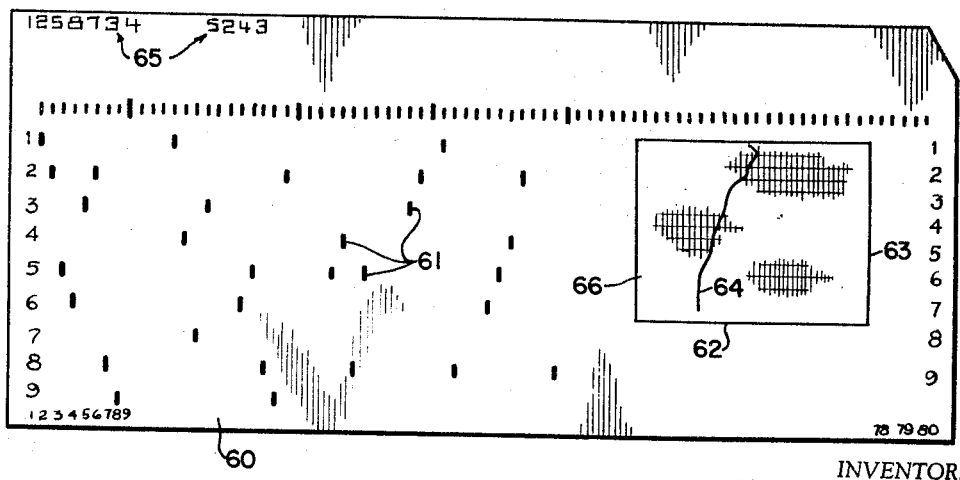
INVENTOR.
SAMUEL A. FRANCIS
BY
*Nolte and Nolte*
ATTORNEYS

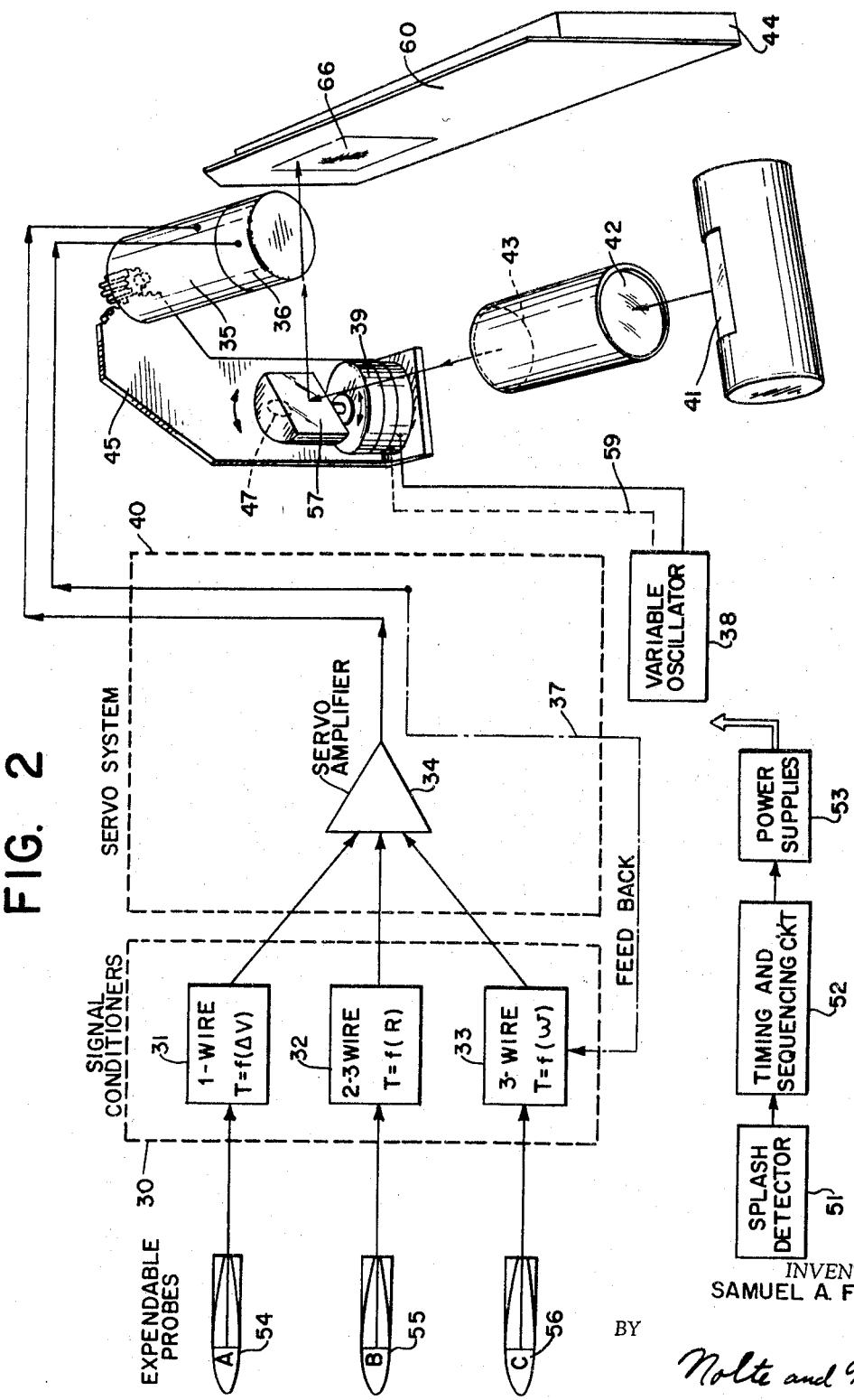

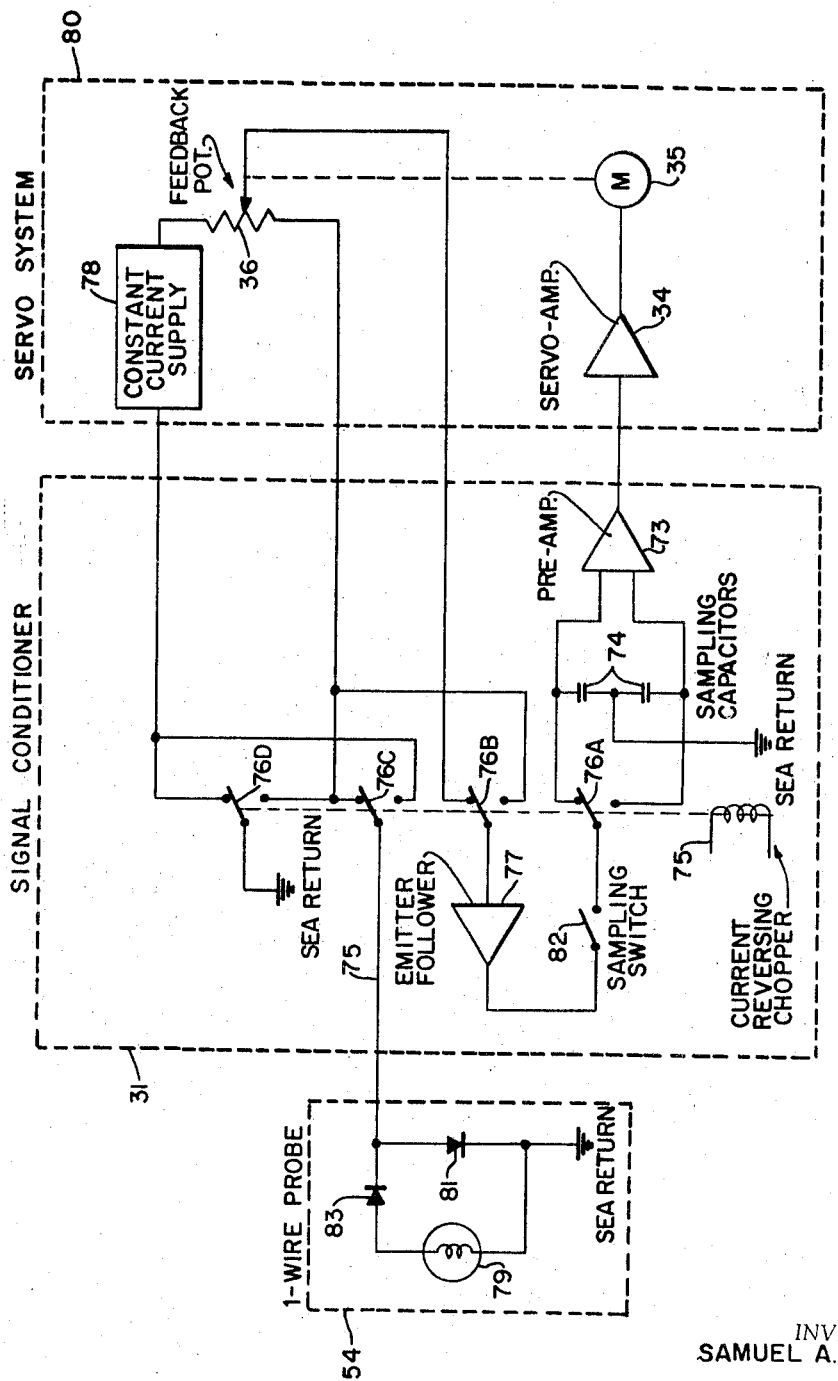

United States Patent Office 3,401,560
Patented Sept. 17, 1968

3,401,560
OCEANOGRAPHIC MEASURING AND
RECORDING DEVICE
Samuel A. Francis, Marion, Mass., assignor to The Sippican Corporation, Mattapoisett, Mass., a corporation of Massachusetts
Filed Apr. 7, 1965, Ser. No. 446,342
8 Claims. (Cl. 73—170)

ABSTRACT OF THE DISCLOSURE

A signal conditioner senses changes in a property of a medium by sensing changes in an electrical signal supplied to it from the medium and indicating the property of the medium and produces a first signal derived from the changes. A reflective surface mounted for rotation about first and second perpendicular axes is rotated about the second axis by a first control servomotor under the control of the first signal and about the first axis by a second control electric motor. The electric motor is driven in accordance with time. The first control servomotor produces via a voltage divider a voltage in accordance with the rotation of the reflective surface about the second axis. The voltage and the electrical signal are compared to produce the first signal from the difference between the voltage and the first signal in a manner whereby the rotation of the reflective surface about the second axis is proportional to the magnitude of the changes in the property of the medium. A beam of light directed to the reflective surface is reflected therefrom and impinges upon a record medium. The record of light upon the record medium is developed by heat and the various components are controlled in their energization and deenergization by a controlled power source.

---

This invention relates to an apparatus for the measuring and recording of signals transmitted from a remote signal producing means. More particularly, this invention relates to an apparatus for the measurement and recording of data transmitted by a remote electrical probe employed for the measurement of underwater characteristics.

In large bodies of water, properties such as temperature, salinity, etc. change considerably with respect to depth and, thus, it is desirable to provide a means for detecting and recording these properties at different points in the ocean. For example, the variation of temperature, or the existence of low depth liquid layers at a specific temperature, can seriously affect the properties of acoustic energy as it is propagated through the water. Such changes may seriously affect the performance of sonar devices used for both weapon systems and commercial fish detecting purposes.

Various devices and methods have been proposed for the collection of data necessary to accurately determine ocean properties such as temperature and salinity over a wide range of depths. The proposed systems however have been found lacking in both accuracy and the ability to reduce the collected data rapidly and automatically. Moreover, the present systems have been found to be only useful over limited depth ranges and often require a reduction in the speed of the lunching ship during the measuring period.

Accordingly, the main object of the present invention is to provide an apparatus for the rapid and automatic measurement of data transmitted from a remote sensing probe located within a body of water.

Another object of the present invention is to provide a data measuring and recording apparatus capable of simultaneously receiving and recording a plurality of data describing the characteristic and properties of a large body of water such as the ocean.

Another object of the present invention is to provide an apparatus for the measurement and recording of data transmitted by a one wire, two wire, or three or more wire aquatic probe carried through a body of water by a moving vessel.

Another object of the present invention is to provide an apparatus for measuring and recording data concerning the properties of a large body of water, both rapidly and automatically on a plurality of punch cards.

Another object, according to the present invention, is to provide an apparatus for recording onto a plurality of punched cards, a graph containing a plot of the data received from a remote sensing device.

Accordingly, it is the purpose of the present invention to provide an apparatus capable of rapidly and automatically measuring and recording data transmitted from a remote aquatic probe that is carried through a medium such as the ocean by a moving vessel in order to provide data for an analysis of salinity, temperature, and other properties. The apparatus herein described employs as its remote sensing means a ballistic sensing probe as described in co-pending application, Ser. No. 342,338, filed on Jan. 31, 1964 and now issued as United States Patent No. 3,221,556. The sensing probe employed in conjunction with the measuring and recording apparatus according to this invention, consists of a small ballistically shaped probe that is launched from a canister contained aboard a moving vessel. The probe contains a precision thermistor or other sensing type of transducer and is connected to a spool of fine wire housed within the probe. The other end of the wire is wound on a second spool mounted within the launching cannister aboard the vessel. After the probe is launched, the wire is played out from both spools as the ship moves along its horizontal path. The dual spooling technique allows the probe to fall freely from the exact point of sea surface entry without being affected by the motion of the ship or the state of the sea to which it is introduced. The nose of the probe is weighted and the entire unit is spin-stabilized to assure a known and steady rate of descent upon deployment from the vessel. Changes in the resistance of the thermistor or other transducing apparatus due to the temperature or property changes in the water are transmitted through the trailing wire to the shipboard measuring and recording apparatus according to the invention. Due to the fact that the probe has a controlled velocity of descent through the water, the depth of the probe may be determined as a function of the time. It is, therefore, possible to provide a single channel control system within the measuring apparatus connected to the probe to record the temperature of the water as a function of the depth, as the probe descends.

The utility of the prior art measuring equipment employed during a series of sea trials has resulted in a high rate of failure as a result of the severe environmental conditions to which the equipment was subjected to aboard a vessel at sea. The best measuring and data recording apparatus known in the art and available for shipboard use does not meet the standard specifications for shipboard environment even when not in operation. When these equipments are operating and are open to allow access to the recording charts, they are extremely vulnerable to a salt air environment. Most of the apparatus known in the art have been designed for industrial or laboratory use where skilled maintenance personnel are readily available from manufacturer's field organizations to service the equipment.

Another major drawback of the prior art equipment is that the data collected and measured is recorded in analog form on standard strip charts or laboratory recorders and, eventually, must be converted to digital form in order to facilitate adequate reduction and analysis of the data gathered. Translation of that data into digital form requires the services not only of skilled personnel, but also requires a substantial amount of time to program each of the surveys as they are gathered.

The ballistic probe, which is launched from the moving vessel and employed to generate the data, is made expendable and released from the moving vessel after the survey has been completed. A simple cost analysis of the parts that are expended has indicated that the wire is by far the most expensive item that is made expendable. It is, therefore, advantageous to employ a probe that is capable of using a single wire conductor rather than two or three wires, and employs the conductivity of the sea to provide the return electrical path. It is, therefore, in the scope of the present invention to provide within the improved data measuring and recording apparatus, circuitry adapted to receive information not only from probes having two or three wire conductors, but also from probes having a single conductor, in order to realize a substantial cost saving possible during the making of these ocean surveys.

The aforementioned advantages, as well as others, will become more apparent in the following discussion of the specific embodiment of the apparatus according to the invention with reference to the attached drawings, in which, FIG. 1 is a perspective view of one embodiment of the measuring and recording apparatus according to the invention.

FIG. 2 is an electrical block diagram of the circuitry employed in the apparatus of FIG. 1.

FIG. 3 is an illustration of a typical punched card employed in connection with the apparatus of FIG. 1 for recording the data gathered, and FIG. 4 is an electrical block diagram of another portion of the circuitry of the apparatus of FIG. 1, capable of measuring or collecting information from a probe having a single wire condutcor.

FIG. 1 shows an external view of the measuring and recording apparatus, according to the invention, wherein all the conductors and controls have been grouped on the front panel to facilitate installation and operation. To insure reliability for a shipboard environment, all moving parts of the control mechanisms and the electronics are housed within sealed container 10. The container 10 consists of a sealing cover 24, a pair of handles 16, mounted on either side and suitable mounting feet 23 joined to its bottom surface. Adjacent to the controls on the front surface of the container is a spring-loaded hinged compartment 25 for receiving the data or recording cards 60 (as illustrated in FIG. 3). A push button 15 is also located on the top surface 14 of the enclosure and is employed at the beginning of each of the survey cycles so as to reset the recording apparatus and prepare for the launching of the probe into the sea. Plug 11, mounted on the front panel of the container 10, is employed to connect to a shipboard power line needed to operate the measuring and recording apparatus. Plug 12, located immediately above plug 11, is employed to connect to a control line from the launching mechanism located near the stern of the moving vessel so as to provide electrical connection to the ballistic sensing probe. The control line transmits data gathered by the probe back to the apparatus and indicates to the apparatus that the probe is ready to be launched. The launching apparatus (not shown) which is described in copending application, Ser. No. 342,338, filed on Jan. 31, 1964 and now issued as United States Patent No. 3,221,556 also employs a splash detector to indicate, after the probe has been launched, the exact moment of its contact with the sea. This information is also supplied through the conductor to plug connection 12. Cap 17, located immediately above plug 12, provides access to a high intensity lamp used within the apparatus. Cap 26, located immediately above cap 17, provides access to a spare high intensity lamp for replacement. The front cover 13 of card enclosure 25 has indicator lights 18–22 provided for indicating the preparedness of each step during the performance of a survey.

In initiating a survey, a ballistic probe is first inserted into a launching mechanism located at the stern of the ship and made ready for launching into the sea. The measuring and recording apparatus is then "turned on" by the actuation of a single power switch (not shown). After a predetermined warm up time, indicator lights 18 and 19 on cover panel 13 light to tell the operator to proceed with the next step. Compartment 25 is then opened and a data recording card 60 is then inserted into a positioning slot. When the compartment is closed, the card is pressed against a glass window (not shown), mounted on the side of enclosure 10. The card 60 can be prepunched with a number and code corresponding to the type of survey to be performed. As shown in FIG. 3, that code consists of a plurality of punched holes 61 disposed along its face along with a corresponding set of numbers printed along the top edge of the card. A rectangular graph 66 is provided at one end of the card containing both horizontal and vertical coordinates 62 and 63, to permit the recording of data thereon. Calibration marks may also be provided on graph 66 to permit compensation for errors due to misalignment of the card and any other servo errors. The vertical coordinate 63 may be employed to correspond with the time or depth of the probe in the sea, and horizontal coordinate 62 may be used to represent the magnitude of the temperature, pressure or other data being sampled by the probe as it descends through the water. By depressing start button 15, located on the top surface of the card enclosure 25, the control mechanism within the recording apparatus resets and calibrates itself in preparation for recording the survey. Completion of this step is indicated by the turning on of "start" light 20. If desired, an indicator light located on the launching mechanism may also turn on to indicate the readiness of the system. When the probe is launched from the moving vessel, indicator light 21 is turned on. A splash detection circuit located near the launching side produces a signal when the probe strikes the water to start the depth control portion of the recording apparatus. The depth drive mechanism within the apparatus controls the vertical deflection of a high intensity beam of light which is projected through the window intermediate card compartment 25 and container 10, so that the beam of light will impinge upon the graph portion 66 of the recording card 60 retained therein. The horizontal deflection of the high intensity beam is controlled by the magnitude of the signals received from the transducer located within the descending sensing probe. Thus, as the probe descends through the water, its rate of descent being proportional to the elapsed time, the light beam scans across the graph 66 of the punched card 60. The portion of punched card 60, containing graph 66, is comprised of a sensitized film which reacts to high intensity light and may be rapidly developed upon the application of heat against the sensitized film. Thus, at the end of the descent of the probe, timing circuits within the measuring apparatus activate heater 44, located immediately behind that portion of the punched card containing the graph 66, so as to cause the trace of light to be developed on the film. No chemicals or liquid developers are required. After approximately one minute has elapsed, indicator light 22 is turned on to show that the card is ready for viewing.

Card 60 may either be directly viewed by holding it up to any light source or placed in a simple viewer to magnify the data displayed to 8½" by 11" size or larger. The cards may also be provided with an overlay of the predicted trace of the probe for that particular survey. The grid pattern of the graph 66 also need not be included on card 60 until afte the survey has been completed. The information thus recorded on the trace of the punch card may be then converted by any known means such as a flying spot scanner into digital form to enable it to be statistically analyzed with the data from other surveys. Thus, by recording the data on the punch cards, along with its corresponding code and references contained within the punchings on the card, it is possible to rapidly and automatically make a large number of surveys in a short amount of time and permit the data contained on each card to be rapidly stored, retrieved, sorted, reproduced, and converted into digital form, analyzed, and compared with predicted or known results.

FIG. 2 is a block diagram of the electronic system employed within the measuring and recording apparatus, according to the invention. The system has been designed to allow the apparatus to be used in conjunction with any of three or more different types of sensing probes employing from one to three wires connected thereto. Each of the probes 54, 55 and 56 is shown connected to a signal conditioner 30 which is capable of producing an output corresponding to the signals received from the probe. In the case of the present two or three wire systems connected to probes 55 and 56, the signal conditioners 32 and 33 will consist of a resistance bridge circuit and one stage of pre-amplification. The single wire conditioner 31, connected to probe 54, contains a current reversing switch, and a sample and hold preamplifier, and is discussed with reference to FIG. 4. If the probes 54, 55 and 56 are to generate an FM signal to correspond to the characteristics of the ocean, the signal conditioners 30 will then contain a single linear detector and preamplifier stage. Servo amplifier 34 will transform an error signal coupled to its input into a drive voltage to operate and control the angular displacement of the motor shaft of servomotor 35 connected thereto. Servomotor 35 is mechanically coupled coaxially to potentiometer 36 and is mounted on the foot of bracket or platform 45. Servomotor 35 provides horizontal deflection of reflective mirror 57 which is affixed to and rotates with the vertically extending shaft of said servomotor. Reflective mirror 57 may also pivot around swivel axis 47 in response to the motion of the output shaft of depth axis motor 39 so that its vertical deflection will be responsive to the input of motor 39. The input of motor 39 is connected to variable frequency oscillator 38 so that the constant running of the oscillator will cause the output of motor 39 to gradually rotate bracket 45 around axis 47 and thereby rotate mirror 57 in proportion with the rate of descent of the probe through the water.

Oscillator 38 may be made adjustable in frequency to compensate for the different drop rates corresponding to each of the variety of ballistic probes which may be employed for the survey. Since it is possible for some of the probes to have a variable rate of drop because their wire payout changes their underwater weight and thrust, or because temperature variations affect the viscosity of the fluid, it is, therefore necessary to provide a compensating frequency deviation signal which can be fed back through line 59 from the depth motor 39 as the drop proceeds. The high intensity lamp 41, located under cap 17, projects through focusing lenses 42 and 43, a very narrow pencil beam onto the reflective surface of mirror 57. The mirror 57 reflects this beam of light so that it is focused onto the sensitized film 66 of the recording card 60, located within container 25. The light beam is thus capable of defining a trace 64 within the graph area 66 of recording card 60 responsive to the amplitude of both the horizontal and vertical deflections derived by the recording apparatus. By employing the light beam to "write" on the face of card 60, it is thus possible to completely seal the area intermediate container 10 and card compartment 25 and allow the light beam to project through a glass window in the common wall of container and said compartment. By projecting the light beam through a sealed window and focusing it onto the recording card, it is thus possible to provide a measuring and recording apparatus within container 10 whose electronic control circuits are hermetically sealed from the corrosive and extreme environmental conditions experienced aboard a vessel at sea. The only portions of the apparatus which are exposed to these conditions are the elements within compartment 25 when it is momentarily opened to change cards. The components housed within the card compartment 25 comprise heater 44, indicator lamps 18–22, push button switch 15, and the recording card 60. These aforementioned components are the least critical in the operation of the measuring and recording apparatus and are manufactured and assembled within compartment 25 so as to be able to operate under the environmental conditions aboard a moving vessel. The recording card 60 is made of a waterproof paper material slightly thicker than a standard IBM punched card so as to maintain its strength and shape even under extreme conditions of temperature and humidity, and still function in a standard card sorter or reproducer.

As mentioned before, a splash detector 51 is employed near the stern of the ship and adjacent to the apparatus which launches the probe into the sea so as to provide a signal at its output to correspond to the exact moment the probe hits the water. Detector 51 comprises electronic circuitary capable of detecting a current path through the sea between the conductive body of the probe and the ship as soon as the probe contacts the sea. The timing and sequence circuits 52, which are connected to the output of the splash detector, consist of standard solid state timing circuits which sequence the control systems of the measuring and recording apparatus through a complete cycle of operations and turn the indicator lights 18–22 on and off. The output of the timing and sequence circuity 52 is connected to power supply 53 and controls the power supplied to the signal conditioners 30, the servo system 40, the variable oscillator 38, and the heater 44. By controlling the power supply 53, it is thus possible for the timing and sequence circuitry 52 to selectively operate each of the circuit components in the measuring and recording apparatus as needed during a complete cycle of operation. Thus, for example, in response to a signal from the splash detector 51, the timing and sequencing circuit will turn on oscillator 38 so as to correspond in time with the instant at which the probe enters the water. The oscillator will then operate motor 39 so as to provide rotation to the vertical axis of mirror 57 and deflect the light beam along the vertical axis 62 on recording card 60. Since the rate of descent of the probe through the water can be determined, its depth at any time thus becomes a function of the time elapsed after launching. This elapsed time, after launching, is simulated by the running of oscillator 38 so that the light beam reflected from mirror 57 is swept along vertical axis 63 at a rate proportional to the descent of the probe through the water. Splash detector 51 also activates servo amplifier 34 to produce at the input of servomotor 35, a signal derived from the transducer within the head of the sensing probes 54, 55, or 56, having an amplitude proportional to the temperature, pressure, or other property of the ocean being monitored. The signal produced at the output of servo amplifier 34 is actually an "error" signal which causes servomotor 35 to deflect the light beam reflected from mirror 57 along horizontal axis 62 of recording card 60.

The potentiometer 36 is mechanically coupled coaxially to the lower portion of the output shaft of servomotor 35 and rotates therewith to provide a voltage or other signal to signal conditioner 30 along feedback line 37 proportional to the displacement of the output shaft. The other end of the output shaft of servomotor 35 has the reflective mirror 57 secured thereon, and provides angular displacement of the mirror around an axis which is non-parallel and preferably perpendicular in space to swivel axis 47 of platform 45 geared to the output shaft of motor 39. The voltage produced by potentiometer 36 and fed back through line 37 into the signal conditioner is used to cancel the signal produced by the probes 54, 55 or 56 to control the magnitude of the horizontal deflection of mirror 57 produced by servomotor 35 to be proportional to the magnitude of the signal received from the probe. By application of suitable biasing voltages it is also possible to make the horizontal deflection of mirror 57 proportional to the difference between the amplitude of the signal received from the probes 54–56 and some predetermined fixed voltage. Thus, upon deployment of one of the probes into the water, the measuring and recording apparatus, according to this invention, provides a narrow beam of light to trace a line 64 on the face of recording card 60 corresponding to the rate of descent of the probe through the water medium and the instantaneous salinity temperature or other property of that medium.

It is conceivable and within the scope of this invention to provide an additional control circuit having a second mirror corresponding to a second transducer within the sensing probe to provide two traces along the face of card 60, one corresponding to a plot of temperature and depth, and the second corresponding to salinity and depth. From this plot it would thus be possible to additionally calculate the plots of sound velocity with respect to depth, and salinity with respect to temperature.

The timing and sequencing circuits 52 also determine the length of time in which the survey is to be made, or in other words, the maximum depth to which the probe will descend where data will be still recorded. At the end of the cycle of operation, the timing and sequencing circuit 52 will extinguish lamp 41 and apply power to electrical heater 44 for approximately one minute to develop the film on the recording card retained in card compartment 25. The probes 54–56 which are made expendable, will then be released from the moving vessel by cutting the wire connecting it to the launching apparatus. It is also possible for the timing and sequencing circuits to provide calibration marks on graph 66 by momentarily connecting the horizontal and vertical controls to calibrated fixed voltages both at the beginning, during, and/or at the end of each survey so that the recorded data may be compared with the calibration marks produced by the light beam to more accurately determine and define the data collected.

FIG. 4 is an illustration of the circuitry employed within signal conditioner 31 for the measuring of data from probe 54 having a single wire connected thereto. The embodiment and operation of the circuit, according to FIG. 4, is discussed in my application Ser. No. 395,712, filed Sept. 11, 1964 and now abandoned, and will only be discussed briefly within this application. One of the main expenses in performing surveys using expendable probes is the cost of the wire. Since these surveys often employ over 6,000 feet of wire, it is advantageous to provide a system whereby only a single insulated wire is used to transmit the temperature or other information back to the ship. The signal conditioner 31 employs a current reversing chopper 76 having contacts 76a–d responsive to the coil of the chopper and said chopper vibrated to produce an alternating current. Contact 76d, which is connected to the constant current supply 78, produces a constant amplitude bi-directional current through feedback potentiometer 36 and contact 76c to probe 54 by the single insulated wire 75. Probe 54 contains a thermistor 79 mounted in its nose and a pair of polarizing diodes 83 and 81 which make the thermistor 79 responsive to the polarized chopped signals produced by the signal conditioner. The cathode of diode 81 and one terminal of thermistor 79 are connected to the body of the probe which is in electrical contact with the sea. The sea provides a return path for the electrical current back to the signal conditioner and is received by the grounded contact 76d of chopper 76 of the signal conditioner 31. The feedback potentiometer 36 is mechanically coupled to the drive shaft of servomotor 35 and controlled in response to the output of servo amplifier 34 as hereinbefore described with reference to the apparatus of FIG. 2. The reversing current pulses through the probe 54 and feedback potentiometer 36 produce alternating polarity voltage drops equal respectively to the sum of the voltage drops across the resistance of transmission line 75, diode 83, the probe-sea water interface, the sea water return path, the sea water-shipboard interface, and feedback potentiometer 36, and across the sea water shipboard interface, the sea water return path, the probe-sea water interface, diode 81, thermistor 79, and the resistance of transmission line 75.

By synchronously presenting these two voltage drops to the differential input of preamplifier 73, differences between thermistor resistance and feedback potentiometer resistance 36 are sensed and amplified to a level sufficient for the servo amplifier 34. The servo amplifier 34 and servomotor 35 in turn reset the feedback potentiometer 36 for system null. As a result of the rotational displacement of the drive shaft and servomotor 35, the light beam reflected from mirror 57 driven by this shaft, will trace changes in the ocean characteristic measured by thermistor 79 on the recording card.

A thin epoxy insulating coating is provided on transmission line 75 and produces a relatively large capacitance with respect to the ocean. Since the voltage on this line is bi-polar with respect to the sea water, considerable time is required to charge and discharge this capacitance when a sufficient amount of wire is dispensed. The circuit of FIG. 4 also employs a technique for sampling the synchronously demodulated voltage at the output of the probe only after it has had sufficient time to stabilize and the shunt capacitance current is negligible compared to the current through the thermistor 79. After the circuit has had sufficient time to stabilize, the voltage is then sampled and stored within sampling capacitors 74 connected to contact 76a. Emitter follower 77 which is connected to the transmission line 75, through the contacts 76b and 76c, is connected to sampling switch 82. The sampling switch 82 is closed only when the demodulated voltage has had sufficient time to stabilize so that the shunt capacitance current has substantially decreased to zero or become negligible with respect to the current through the thermistor 79.

By the time all of the transmission line 75 has been deployed from the moving vessel and has reached the length on the order of 6000 feet or more, the charging time due to the capacitance of the insulation of the line with respect to the sea return path is so long that the sampling rate of the current reversing chopper 76 must be limited to between 5 and 10 cycles per second. Fortunately, it is not necessary to provide rapid sampling of the temperature gradient of the water when most of the line has been deployed since the probe has reached the deepest portion of its travel where such gradients are gradual. However, when the probe is near the surface, the temperature gradients are very sharp and a 5 cycle per second sampling rate would be inadequate for data collection. Fortunately, at this instant, very little of the wire has been deployed into the sea and the shunt capacitance is considerably smaller. It is thus possible to employ a sampling rate of between 50–100 c.p.s., a rate which is more than adequate to sample all of the data available from the transducer.

It is to be understood that while the embodiment shown describes the invention in a preferred form, changes may be made in the structure without departing from the scope of the invention as defined in the following claims.

What I claim is:

1. Apparatus for measuring and recording a property of a medium at a remote location, said apparatus comprising, a ballistic probe having a transducer responsive to changes in said property;

a signal conditioner for sensing changes in the property of the medium and for producing a first signal derived from said changes;

an electrical conductor connected between said transducer and said signal conditioner;

amplifying means connected to said signal conditioner for amplifying said first signal;

platform means rotatable about a first axis;

a pivotally mounted reflective surface mounted on said platform means for rotation about a second axis nonparallel with said first axis;

first control means having an input connected to said amplifying means and an output coupled to drive said reflective surface about said second axis;

said first control means comprising a servomotor mounted on said platform and having an output shaft coupled to said reflective surface, a voltage divider coupled to and varied by said servomotor and connected to said signal conditioner for providing a voltage to said signal conditioner in response to the angular displacement of said servomotor and means for comparing said voltage with changes in said property for producing said first signal from the difference between said voltage and said property changes in a manner whereby the angular displacement of said servomotor and therefore the displacement of said reflective surface about said second axis is proportional to the magnitude of the changes in the property of said medium;

second control means comprising a variable frequency oscillator having an output for providing a continuous second signal and an electric motor connected to the output of said variable frequency oscillator and coupled to said platform for driving said platform and therefore said reflective surface about said first rotatable axis in a manner whereby the angular displacement of said reflective surface about said first axis is proportional to the frequency of said second signal;

a high intensity light source projecting a narrow beam of light onto said reflective surface;

a recording card having a light-sensitive portion positioned to receive and record light reflected from said reflective surface;

heating means in operative proximity with said recording card for heating said card to develop the record of light on said card; and a timing and sequencing circuit for energizing said light source, said amplifying means and said first and second control means in accordance with the entry of said probe into said medium, for deenergizing said first and second control means upon the completion of recording, and for energizing said heater upon the completion of recording for a determined period of time to develop the record of light on said card.

2. Apparatus as claimed in claim 1, wherein said first and second axes are substantially perpendicular to each other.

3. Apparatus as claimed in claim 1, wherein said electrical conductor comprises a single electrically conductive lead, said medium between said probe and said signal conditioner providing an additional circuit connection between said probe and said signal conditioner.

4. Apparatus as claimed in claim 1, wherein the displacement of said reflective surface about said first axis is proportional to the time said probe is immersed in said medium and the displacement of said reflective surface about said second axis is proportional to changes in said property of said medium.

5. Apparatus for measuring and recording a property of a medium at a remote location as indicated by an electrical signal supplied to said apparatus, said apparatus comprising a signal conditioner for sensing changes in the property of the medium by sensing changes in the electrical signal supplied to said apparatus and for producing a first signal derived from said changes;

amplifying means connected to said signal conditioner for amplifying said first signal;

a reflective surface mounted for rotation about first and second non-parallel axes;

first control means connected to said amplifying means and coupled to said reflective surface for rotating said reflective surface about the second of said axes;

second control means comprising electric motor means coupled to said reflective surface for rotating said reflective surface about the first of said axes and variable frequency oscillator means connected to said electric motor means for driving said electric motor means in a manner whereby said electric motor means rotates said reflective surface in proportion with the frequency of the output of said variable frequency oscillator means and therefore in proportion with time;

light means for directing a beam of light to said reflective surface;

a recording medium positioned to receive and record light reflected from said reflective surface;

developing means for developing the record of light on said recording medium; and controlled power means connected to said light means, said amplifying means, said first and second control means and said developing means for controlling the energization and deenergization of said light means, said amplifying means and said first and second control means at the commencement and termination of measuring and recording and for energizing said developing means for a determined time at a determined time.

6. Apparatus as claimed in claim 5, wherein said first control means comprises a servomotor coupled to said reflective surface, a voltage divider coupled to and varied by said servomotor and connected to said signal conditioner for providing a voltage in accordance with the rotation of said servomotor and therefore with the rotation of said reflective surface about said second axis and means for comparing said voltage with said electrical signal for producing said first signal from the difference between said voltage and said first signal in a manner whereby the rotation of said servomotor and therefore the rotation of said reflective surface about said second axis is proportional to the magnitude of the changes in the property of said medium.

7. Apparatus as claimed in claim 5, wherein said recording means comprises a recording card having a light-sensitive portion for recording the path of light impinging thereon and developable by the application thereto of heat.

8. Apparatus as claimed in claim 6, wherein said recording means comprises a recording card having a light-sensitive portion for recording the path of light impinging thereon and developable by the application thereto of heat, and said developing means comprises heating means in operative proximity with said recording card for heating said card to develop the record of light on said card.

References Cited

UNITED STATES PATENTS

| 2,579,220 | 12/1951 | Vine | 73—178 |
| 2,741,126 | 4/1956 | Anderson et al. | 73—170 X |
| 2,930,668 | 3/1960 | Behrmann et al. | 346—8 |
| 3,108,473 | 10/1963 | Serra et al. | 73—188 |
| 3,148,612 | 9/1964 | Jacobs et al. | 346—109 X |

RICHARD C. QUEISSER, *Primary Examiner.*

JERRY W. MYRACLE, *Assistant Examiner.*